UNITED STATES PATENT OFFICE.

GIUSEPPE CALLODI, OF CHICAGO, ILLINOIS.

EMBALMING FLUID.

1,386,157. Specification of Letters Patent. Patented Aug. 2, 1921.

No Drawing. Application filed January 25, 1919. Serial No. 273,195.

*To all whom it may concern:*

Be it known that I, GIUSEPPE CALLODI, a citizen of Italy, town of Atto, in the Province of Lucca, and subject of King Victor Emanuel, at present residing at Chicago, county of Cook, and State of Illinois, have invented certain new and useful Improvements in Embalming Fluid, of which the following is a full, clear, concise description, so that any persons skilled in the art can make and use the same.

The object of this invention is primarily to provide an embalming fluid for the purpose of embalming human and animal tissue and the preservation of cadavers in a more thorough, less objectional, a more economical manner than that of other fluids used for similar purposes.

By experimentation and use I have discovered and invented what may be designated as an improved embalming fluid which may be employed in the preparation of bodies for anatomical purposes, by baths or injections into the arteries. The principal ingredient of my improved fluid is turpentine, and preferably that kind, known as wood turpentine, produced by the process of destructive distillation, in which creosote and various gums are suspended. The turpentine, however, does not appear to act by direct combination, but by the complete catalytic coagulation it produces in all the tissues of the body that have protein for their base. Another remarkable property of my improved embalming fluid is that it coagulates albumen and the coloring matter of the blood, and bodies preserved with it are no longer susceptible of putrefaction. Fibrin, or muscular flesh immersed in my fluid for a short time has no tendency to putrefy, even if exposed to the heat of the sun afterward. With the fluid turpentine I also use a quantity of chlorid of sodium—common salt—suspended in the fluid, which also acts in preserving animal tissue by its affinity for water, and thereby the water necessary for putrefaction is removed, or combined with the saline chemical. The antiseptic property is also recognized.

During putrefaction, at a stage prior to any fetid gas being evolved, a peculiar organic substance is generated, possessed of intensely poisonous properties. My improved fluid not alone is a preservative, but it is thoroughly antiseptic, destroying the toxic products of putrefaction.

I also use a limited quantity of the sulfate of calcium mixed with the salt and turpentine, which remains suspended in the fluid turpentine, and by the mobility of the fluid is carried to the various parts of the body in the embalming process. The function of the sulfate of calcium is, aside from its solidifying property, to deodorize, by absorbing the fetid and ammoniacal gas, and as a deodorant it does away with the disagreeable odors, the product of dead and decaying matter.

My improved embalming fluid is preferably composed of a mixture of turpentine, chlorid of sodium and sulfate of calcium in proportions as follows:

Turpentine_____ 1 gallon.
Chlorid of sodium_____ 40 grams.
Sulfate of calcium____ 40 grams.

In order to thoroughly mix these ingredients, I heat the turpentine to a temperature of 160 degrees F. and then add the salts, by gradually stirring them into the heated turpentine, I have found that the compounded fluid completely penetrates unbroken skin and all parts of the body, with the exception of ossified skeleton and its pathologic remedy consists in arresting putrefaction, preserving animal and human fibrin, as a desiccative, an antiseptic, a preventive of fermentation and as a deodorant. The pungent odor of the turpentine is quickly dissipated by volatilization, while the remaining portion solidifies and leaves the body or specimen treated, rigid, unyielding and bone-like in hardness, a condition equivalent to petrifaction.

Without limiting myself to the exact proportions, or to the process of compounding the fluid herein described what I claim and desire to secure by Letters Patent, is:

An embalming fluid of the class described, comprising a mixture of turpentine, sodium chlorid and sulfate of calcium in approximately the proportions of forty grams of sodium chlorid and forty grams of sulfate of calcium per gallon of turpentine.

GIUSEPPE CALLODI.

Witnesses:
FULTON GARDNER,
PETER GIRALDI.